(12) United States Patent
Cheng

(10) Patent No.: US 11,768,930 B2
(45) Date of Patent: *Sep. 26, 2023

(54) APPLICATION AUTHENTICITY VERIFICATION IN DIGITAL DISTRIBUTION SYSTEMS

(71) Applicants: Atlassian Pty Ltd., Sydney (AU); Atlassian Inc., San Francisco, CA (US)

(72) Inventor: Jerry Cheng, Mountain View, CA (US)

(73) Assignee: ATLASSIAN PTY LTD., Sydney (AU)

( * ) Notice: Subject to any disclaimer, the term of this patent is extended or adjusted under 35 U.S.C. 154(b) by 15 days.

This patent is subject to a terminal disclaimer.

(21) Appl. No.: 17/315,069

(22) Filed: May 7, 2021

(65) Prior Publication Data

US 2021/0279323 A1 Sep. 9, 2021

Related U.S. Application Data

(63) Continuation of application No. 15/786,174, filed on Oct. 17, 2017, now Pat. No. 11,003,757.

(51) Int. Cl.
*G06F 21/44* (2013.01)
*H04L 9/40* (2022.01)

(52) U.S. Cl.
CPC ............ *G06F 21/44* (2013.01); *H04L 63/083* (2013.01)

(58) Field of Classification Search
None
See application file for complete search history.

(56) References Cited

U.S. PATENT DOCUMENTS

| | | | |
|---|---|---|---|
| 8,179,586 B2 | 5/2012 | Schofield et al. | |
| 8,505,102 B1 | 8/2013 | Cannings et al. | |
| 8,719,586 B1 | 5/2014 | Paleja et al. | |
| 9,148,460 B1 | 9/2015 | Sun et al. | |
| 9,596,298 B1* | 3/2017 | Bekiroglu | H04L 67/1001 |
| 10,044,695 B1 | 8/2018 | Cahill et al. | |
| 10,719,600 B1 | 7/2020 | Cheng et al. | |
| 2012/0304260 A1* | 11/2012 | Steeves | H04L 67/535 726/5 |
| 2013/0031623 A1 | 1/2013 | Sanders | |
| 2013/0104118 A1 | 4/2013 | Somani et al. | |
| 2013/0133079 A1 | 5/2013 | Eskin et al. | |
| 2014/0007213 A1 | 1/2014 | Sanin et al. | |

(Continued)

*Primary Examiner* — Benjamin E Lanier
(74) *Attorney, Agent, or Firm* — Brownstein Hyatt Farber Schreck, LLP

(57) ABSTRACT

Techniques are provided for client application authentication and include receiving a request to authenticate an application and, based on the received request to authenticate the application, sending a request to perform a push communication, including a short-term shared key, to a digital distribution system, wherein the digital distribution system is a distribution source of the application. The digital distribution system attempts to send the push communication including the short-term shared key to the application. The techniques may proceed by receiving a request for resources from the provider client application and determining whether the application has the short-term shared key. When it is determined that the application has provided the short-term shared key, the requested resources to the application may be provided, otherwise, the requested resources may be denied.

20 Claims, 4 Drawing Sheets

(56) References Cited

U.S. PATENT DOCUMENTS

| | | | |
|---|---|---|---|
| 2016/0140637 A1* | 5/2016 | Szabo | G06Q 30/0282 |
| | | | 705/14.54 |
| 2017/0063975 A1 | 3/2017 | Prakash et al. | |
| 2017/0149795 A1 | 5/2017 | Day, II et al. | |
| 2017/0195879 A1 | 7/2017 | Jones-McFadden et al. | |
| 2017/0206525 A1 | 7/2017 | Sylvain | |

* cited by examiner

APPLICATION AUTHENTICITY VERIFICATION IN DIGITAL DISTRIBUTION SYSTEMS

CROSS-REFERENCE TO RELATED APPLICATION(S)

This application is a continuation patent application of U.S. patent application Ser. No. 15/786,174, filed Oct. 17, 2017 and titled "Application Authenticity Verification in Digital Distribution Systems," the disclosure of which is hereby incorporated herein in its entirety.

FIELD

The techniques described herein relate to application security authentication, and in particular to application authentication in the context of digital distribution systems.

BACKGROUND

Many companies and individuals build mobile applications for devices such as tablets and smart phones. This software is often distributed by Google Play Store or Apple Store, but it can also be downloaded from other sources. Many of these applications can and must access back-end services, sensitive information, etc. Legitimate applications with legitimate users (e.g., logged-in, including by use of multi-factor authentication) accessing back-end services and sensitive information is not an issue. Issues arise, however, because these applications can also be "spoofed", meaning that a nefarious actor can build software that appears to be the legitimate software. The nefarious software may then be able to access these back-end services, sensitive data, etc. The back-end service will usually have no way to determine whether the software making a call to access services or data is a legitimate application or a nefarious actor. A form of this problem occurs when a legitimate user believes she is using a legitimate application, but the application is spoofing the original provider client application. As such, when the user logs into the nefarious or spoofing application, the provider will provide the nefarious application all of the access the user would be provided if she were using the legitimate application.

One security measure to combat these nefarious actors is an application key. The issue with application keys is that the original software can be decompiled, and the nefarious actor can then get access to or mimic the application key. The nefarious or spoofing software can then access that which should be restricted to the legitimate software (back-end services, sensitive information, etc.). Thus, the application key does not provide the protections needed.

The techniques described herein address those issues.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided herein for determining provider client application authenticity. In some embodiments, the techniques include a provider system, a digital distribution system, and a particular device (e.g., the device requesting to have it application authenticated). In some embodiments, the provider system receives a request to authenticate a provider client application, and based on that, sends a request to perform a push communication to the digital distribution system that was the distribution source of the provider client application. The request to perform the push communication includes a short-term shared key.

In some embodiments, the digital distribution system receives the request to perform the push communication to the provider client application on the particular device from the provider and attempts to send the push communication to the particular device associated with the provider client application based at least in part on a record of having distributed the provider client application to the particular device. The record is private to the digital distribution system.

If the push communication is successful, the particular device will receive the short-term shared key. If the particular device receives the short-term shared key, the particular device will be able to access resources using the received short-term shared key. In some embodiments, if the particular device does not receive the short-term shared key, it will not be able to access resources and/or it may be blocked.

The provider system, upon determining whether the provider client application has the short-term shared key provided to the digital distribution system as part of the request for the push communication will either provide the requested resources to the provider client application when it is determined that the provider client application has provided the short-term shared key or deny the requested resources when it is determined that the provider client application has not provided the short-term shared key.

Some embodiments include receiving a request to authenticate the provider client application and, based on the received request to authenticate the provider client application, sending a request to perform a push communication to a digital distribution system, wherein the digital distribution system is a distribution source of the provider client application, the request to perform the push communication includes a short-term shared key, and the digital distribution system attempts to send the push communication including the short-term shared key to the provider client application. The process may proceed by receiving a request for resources from the provider client application and determining whether the provider client application has the short-term shared key provided to the digital distribution system as part of the request for the push communication. When it is determined that the provider client application has provided the short-term shared key, the requested resources to the provider client application may be provided, otherwise, the requested resources may be denied when it is determined that the provider client application has not provided the short-term shared key.

In some embodiments, the process may further include sending the provider client application a negative authentication message indicating prohibited execution of the provider client application when it is determined that the provider client application has not provided the short-term shared key and/or blocking execution of the provider client application when it is determined that the provider client application has not provided the short-term shared key.

In some embodiments, the process further includes determining a particular digital distribution system to which to send the request based at least in part on a push token associated with the provider client application.

The request to authenticate the provider client application may be based on attempted execution of the provider client application.

In some embodiments, the process includes receiving from the digital distribution system a success/failure response for the digital distribution system attempting to send the requested push communication to the provider client application, wherein the success/failure response is determined at least in part based on the digital distribution system determining a device to send the push communication at least in part based on a record of the provider client application having been obtained from the digital distribution system, wherein the record is private to the digital distribution system; the digital distribution system attempting to send the push communication to the determined device; and the digital distribution system sending a success response when the digital distribution system successfully sends the push communication to the determined device and otherwise sending a failure response. Further, the process may include sending the provider client application a positive authentication message in response to the request to authenticate when the success/failure response indicates success.

The process may continue by sending the provider client application a negative authentication message when the success/failure response indicates failure. A failure may be generated in response to detecting an error with a push token associated with the provider client application, in response to detecting a push token associated with the provider client application is no longer active; in response to there being no record of the provider client application having been obtained from the digital distribution system; and/or in response to the digital distribution system having received more than a predefined threshold number of requests for a device token associated with the provider client application.

Some embodiments include a digital distribution system performing the process of receiving a request to perform a push communication to a provider client application on a particular device from a provider, wherein the request to perform the push communication for the provider client application was generated based on the provider receiving a request to authenticate the provider client application on the particular device and the request to perform the push communication includes a short-term shared key to push to the particular device; and attempting to send the push communication with the short-term shared key to the particular device associated with the provider client application based at least in part on a record of having distributed the provider client application to the particular device, wherein the record is private to the digital distribution system, wherein the provider determines whether to share resources with the particular device based at least in part on the successful sending of the short-term shared key to the particular device by the digital distribution system.

The process performed by the system may further include sending a success/failure response to the provider based at least in part on whether the attempt to send the push communication to the particular device associated with the provider client application was a success or failure, wherein the provider determines whether to authenticate the provider client application based at least in part on the determined success or failure response sent to the provider; sending a failure response when no record is available of the digital distribution system having distributed the provider client application to the particular device; generating a success/failure response indicating failure in response to detecting an error with a push token associated with the provider client application; generating a success/failure response indicating failure in response to detecting the push token is no longer active; generating a success/failure response indicating failure in response to the digital distribution system having received more than a predefined threshold number of requests for a device token associated with the provider client application; and/or generating a success/failure response indicating success when the push communication is successful.

In some embodiments, the techniques include a device performing a process including requesting authentication of a provider client application from a provider associated with the provider client application, wherein, in response to receiving the request to authenticate the provider client application, the provider will request a digital distribution system to push a short-term shared key to the device, if the requested push communication is successful, the device will receive the short-term shared key; in response to receiving the short-term shared key, attempting to access resources using the received short-term shared key; and in response to not receiving the short-term shared key, blocking execution of the provider client application. Requesting authentication may include requesting authentication in response to attempted execution of the provider client application on the device and/or requesting authentication comprises requesting authentication in response to installation of the provider client application on the device.

DETAILED DESCRIPTION

Figure 1A:
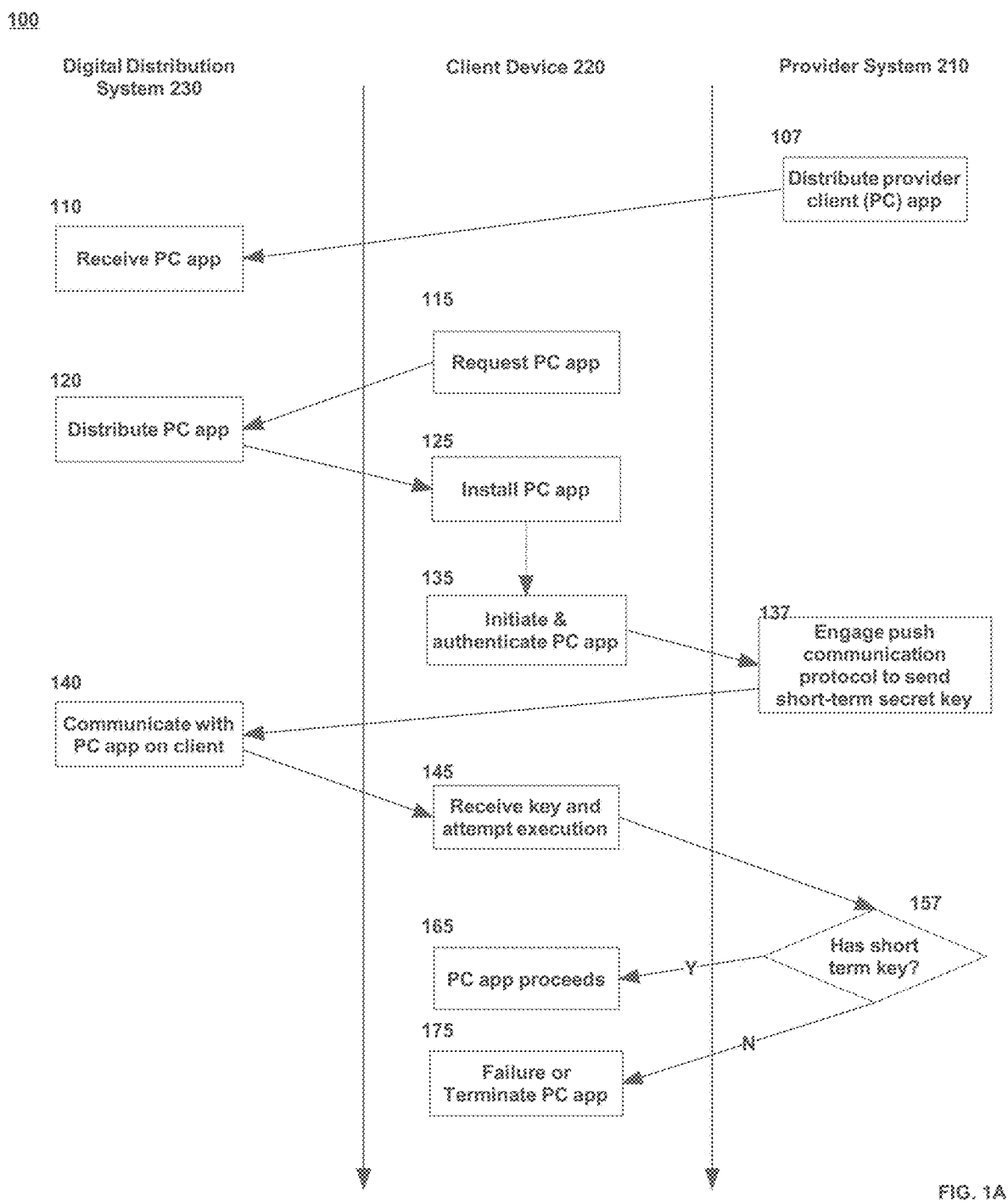
FIGS. 1A and 1B depict example processes for determining provider client application authenticity in digital distribution systems.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

After creation of a client application, a provider will typically upload the application to a digital distribution system (e.g., the Google Play Store and the Apple Store). The client application uploaded by the provider may have associated with it an application key and other security measures, but, without more, may be "spoofable." So, a nefarious actor might be able to decompile the code, obtain the application key, and spoof operation of the client provider client application. In such situations, it may be difficult or impossible for providers to determine whether requests are coming from legitimate client applications or those of nefarious actors. As noted above, this can be the case even if a legitimate user has logged into the nefarious application using single or multi-factor authentication. If the provider client application and/or the legitimate user has access to sensitive human resources data, etc., then this spoofing can be yet more detrimental.

In order to counteract this spoofing, the provider may use the techniques herein. In some embodiments, the techniques work by utilizing private information and communication channels accessible only to the digital distribution system to provide only legitimate applications with a short-term shared key. The short-term shared key can then be used by the legitimate applications to interact with the provider, access resources, etc.

Most applications that run on client devices are downloaded from digital distribution systems. The digital distribution systems keep track of applications that have been downloaded, and can later route communications from a provider of an application to the client application using the stored information. This mechanism is particularly useful because it allows application providers to communicate with downloaded applications without having to know precisely how to route messages to the client applications. Instead, they simply use the communication service provided by the digital distribution system. This communication mechanism also is useful for the techniques herein.

When a provider wants to ensure a request is coming from a legitimate client application and not a nefarious spoofer, the provider can have the digital distribution system perform a push notification to send a legitimate client application a short-term shared key. The digital distribution system, with the information and records private to the digital distribution system (e.g., a record of downloaded applications) will then attempt to communicate directly with the client application to provide it the short-term shared key. If it succeeds, the legitimate client application will have and can provide the short-term shared key in communications with the provider, and the provider can be assured that it is communicating with the client application that was downloaded from the digital distribution system. If the push communication fails, which it will in the case of nefarious applications, then the (nefarious) application will not have the short-term shared key and will not be able to effectively communicate with the provider.

Users, unlike provider client applications, can be authenticated using multi-factor authentication. Multi-factor authentication may be based on the premise that an unauthorized actor trying to impersonate a legitimate user is unlikely to be able to supply the factors required to authenticate. If at least one of the factors is missing or supplied incorrectly, the user's identity is not established with sufficient certainty to authenticate and remains blocked. The authentication factors of a multi-factor authentication scheme may include a physical object (e.g., a dongle with a secret key, a bank card, etc.), a secret known to the user (e.g., a password, pin, etc.), a characteristic of the user (e.g., biometrics such as a fingerprint, iris, etc.). The techniques herein can be used in conjunction with multi-factor authentication in order to ensure both that the user is a legitimate user and that the provider client application is not nefarious. For example, a provider may use the techniques herein where, in part, the digital distribution system pushes a short-term shared key to the provider client application in order to authenticate the provider client application, and use a multi-factor authentication scheme to ensure that the user logged into the provider client application is a legitimate user.

Verifying Provider Client Application Authenticity

Figure 1B:
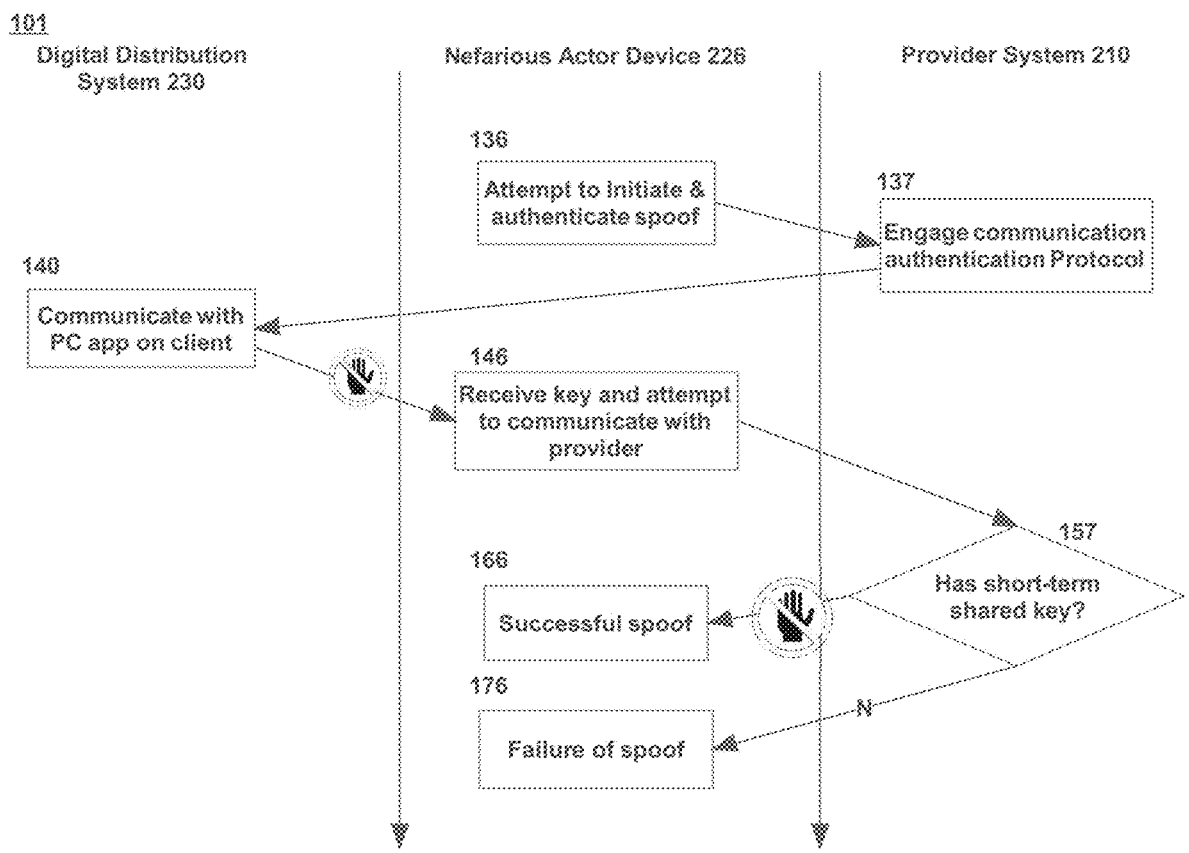

FIGS. 1A and 1B depicts example processes for determining provider client application authenticity in digital distribution systems. FIG. 1A depicts the flow of information and performance of activities for a provider system 210, a client device 220, and a digital distribution system 230. The provider system 210, a client device 220, and a digital distribution system 230 are described more with respect to FIG. 2 below. FIG. 1B depicts the flow of information and performance of activities when a nefarious actor device 226 is attempting to spoof a client application.

In some embodiments of process 100, after creation of a provider client application, the provider system 210 will upload this application to the digital distribution system 230. The digital distribution system 230 will make this available to users, who will then download and install the application. In FIG. 1, this is depicted as client device 220 requesting 115 the provider client application, the digital distribution system 230 providing 120 it, and the client device 220 installing 125 the application. When the client device 220 tries to initiate and authenticate 135 the provider client application with the provider system 210, the provider system 210 will engage the push communication 137 protocol with the digital distribution system 230 to send the client device 220 the short-term shared key needed to interact with the provider system 210. The request to perform the push communication 137 may include the provider system 210 using a digital certificate in order for the digital distribution system 230 to ensure that it is communicating with the valid provider system 210.

The digital distribution system will attempt to push a communication 140 to the client device 220, which, if successful, results in the client receiving 145 the short-term shared key from the digital distribution system 230. If the push communication from the digital distribution system 230 to the client device 220 failed, then the client device 220 will not have the short-term shared key needed for interaction with the provider system 210, and the application may terminate or otherwise fail to function 175.

Returning to the start of process 100, provider system 210 distributes 107 the provider client application to the digital distribution system 230, and the digital distribution system 230 receives 110 it. In some embodiments, this may include uploading the client application in binary or other executable form to the digital distribution system 230. Typically, the provider system 210 will upload a single, copyable version of the client application to the digital distribution system 230. The digital distribution system 230 will typically have thousands of applications, but that need not be the case. As an example, consider a human resources (HR) application provided by provider system 210, distributed 107 to the digital distribution system 230. The digital distribution system 230 receives 110 the HR application and makes it available for download by those using the digital distribution system.

Figure 2:
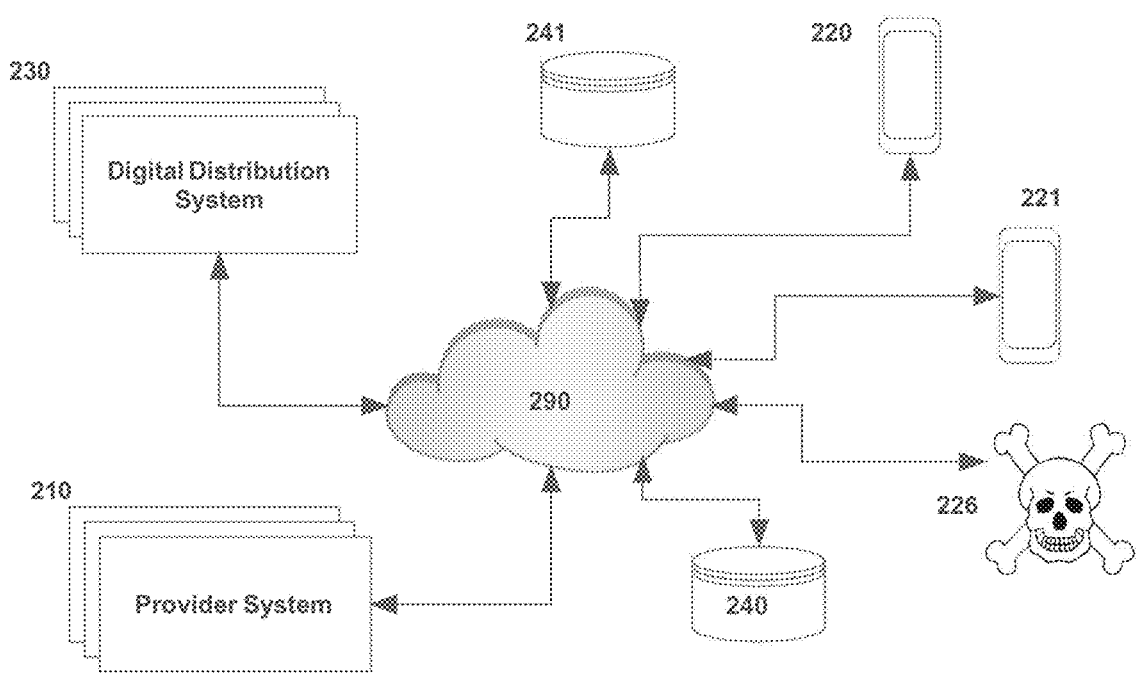
FIG. 2 depicts an example system for determining provider client application authenticity in digital distribution systems.

When a client device 220 requests 115 the provider client application, the digital distribution system 230 distributes 120 the provider client application to the client. Often this is accomplished by the digital distribution system 230 sending a copy of the uploaded client application to the client device 220. In some embodiments, the distribution 120 of the provider client application is accompanied by the digital distribution system 230 maintaining a record of the distribution of the provider client application to the client device 220. This record may include one or more device identifiers (such as a globally-unique device identifier), application identifiers, digital distribution system user account information, country and/or other location information, as well as other identifying information. Referring to FIG. 2, the digital distribution system 230 may store this information in storage that is local to the digital distribution system 230, in network-coupled storage 240, 241, or in any other appropriate and/or secure location. After the digital distribution system 230 distributes 120 the provider client application to the client device 220, the client device installs 125 the provider client application.

Returning the to the digital distribution example, a user of a smart phone 220 may request 115 the HR application from the digital distribution system 230, which will then distribute 120 the HR application back to the requesting device 220, which will then install 125 the HR application.

After installation 125 (e.g., immediately, upon running the application, etc.), the client will attempt to initiate and/or authenticate 135 the provider client application. In some embodiments, authentication 135 may happen one time, after which the provider client application might be determined as a known-authenticated application by the provider system 210. In some embodiments, the authentication 135 may happen every time communications of a certain type are attempted by the provider client application (e.g., at each login, at each accessing of sensitive data, etc.). In some embodiments, authentication may be requested after a predetermined time period has elapsed (e.g., a time period at, below, or above the amount of time that a short-term shared key is valid). Authentication 135 may also happen at regular or sporadic intervals, randomly, based on other risk factors, etc. For example, in some embodiments, if a local short-term shared key has expired, the provider client application may attempt to authenticate 135. As another example, if it is detected that the provider client application is being executed on the client device 220 and the client device appears to be in a different state or country than previously associated with the device, then authentication 135 may occur.

Authenticating 135 the client may include sending a message to the provider system 210 requesting authentication. Such a request may include identification of the provider client application, including one or more unique identifiers that specify which copy of the provider client application is making the request, what digital distribution system 230 the provider client application was originally downloaded from, etc.

The request to authenticate and any accompanying information may be received by the provider system 210, and the provider system 210 may then send the digital distribution system 230 a request to perform a push communication with the client device 220. In some embodiments, a push token may be sent as part of the request to authenticate the application. The push token sent from the provider system 210 to the digital distribution system 230 may include an identification of the client device 220 that is requesting authentication (such as a globally-unique device identifier). The request to engage the push notification protocol will be accompanied by a short-term shared key from the provider, and the request may include a request to send the short-term shared key from the digital distribution system 230 to the client device 220. This short-term shared key can be anything recognizable by the provider client application and/or the provider, such as a timestamp, an encrypted timestamp, a hashed timestamp, a unique identifier, and the like. Depending on implementation, the short-term shared key may be available for milliseconds, seconds, minutes, etc. For example, the time limit of the short-term shared key may be 5 minutes.

Returning to the digital distribution example, the smart phone user may open the application, and the application may attempt to authenticate 135 itself with the provider system 210. The provider system 210 may then start the push communication 137 protocol by accessing a push token associated with the smart phone 220, and may send the request to do the push notification with the push token and a short-term shared key to digital distribution system 230.

In attempting to communicate 140 based on the requested push communication 137 from the provider system, the digital distribution system 230 may access previously-stored identification information in order to determine whether the provider client application on the client device 220 was provided to the client device 220 from the digital distribution system 230. In some embodiments, the previously stored identification information is determined based on the push token sent from the provider system 210, and is accessed from storage 240, 241 of FIG. 2 or from storage local to digital distribution system 230. For example, the information used to communicate 140 may contain the necessary identification information, routing information, client device information, etc. for the digital distribution system 230 to communicate 140 with the client device 220. If the digital distribution system 230 determines that it had previously distributed 120 the provider client application to the client device 220, then it will use the previously-stored identification information stored during the distribution 120 to communicate 140 with the client device 220. The communication 140 can be over any appropriate protocol, such as TSL, SSL, HTTP, FTP, TCP/IP, or the like.

If the digital distribution system 230 is able to locate the record for the provider client application on the client device 220, then the client device will receive 145 the short-term shared key from the 230. The client device 220 may store this short-term shared key in memory associated with the client device 220, such as RAM on the client device 220 and/or in coupled storage such as storage 240 or 241.

The client device 220 will attempt execution, including calling application program interfaces and the like using the received short-term shared key. In some embodiments, when attempting to access resources (application program interface, data, etc.), the client device 220 will use a tuple of username, password, and the short-term shared key. In some embodiments, the client device 220 may also include in the tuple an application key. When the request for resources comes into the provider system 210 from the client device 220, a check is made whether the client is using an authentic 157 short-term shared key. The check of the short-term shared key may include comparing the short-term shared key in the calls from the provider client application running on the client device 220 against the identity of the short-term shared key stored at the provider system 210. For example, if the short-term shared key was an encrypted unique identifier valid for only a short time period, then the provider system 210 may decrypt the short-term shared key and compare the unique identifier from the decrypted short-term shared key with the expected unique identifier for the provider client application running on the client device 220.

If the identity of the short-term shared key from the provider client application running on the client is verified, then the provider client application proceeds 165, otherwise, it terminates 175 or otherwise does not proceed. If the provider client application can proceed 165, it can perform any activity associated with a legitimate provider client application, including, in some embodiments, accessing resources from the provider system 210, calling application program interfaces provided by the provider system 210, and the like.

In some embodiments, if the provider client application is determined to be inauthentic 157, then the provider system 210 may not respond to the client device 220, causing the client device or provider client application to timeout, cease execution, or otherwise enter a fail state. In some embodiments, the provider client application will be blocked from execution if it is determined to be inauthentic 157. This blocking may be done by the provider system 210, the client device 220, and/or the digital distribution system 230. For example, consider a scenario in which the client device 220 does not have knowledge of whether it is running an authentic version of the provider client application. If it receives an indication that the provider client application it attempted to authenticate is inauthentic, then it may block execution of the provider client application. In some embodiments, the provider client application will be blocked and/or not execute based on not having access to the short-term shared key.

Returning to the digital distribution example, if the provider system 210 determines that the HR application is inauthentic based on the key sent from the client device 220, then the provider system 210 may terminate 175 or not allow access to APIs, data, or other resources to the HR application on the client device 220. If the digital distribution system communicated to the provider that the push communication was a success, however, then the provider may allow the application on the client device 220 to proceed 165.

Example of Detecting a Nefarious or Spoofing Application

FIG. 1B depicts an alternative view of a portion of process 101, or a subprocess 101 of the process 100 (depicted in FIG. 1A). The process 101 highlights the actions taken when a nefarious actor device 226 attempts to spoof a provider client application. Although not depicted in FIG. 1B, the portion of the process 100 labeled 105-125 may proceed as depicted in and described with respect to FIG. 1A before the subprocess 101 executes.

As depicted in FIG. 1B, the nefarious actor device 226 may attempt to spoof 136 a provider client application. In doing so, it may attempt to authenticate with the provider system 210 in order to execute. When the provider system 210 receives the request to authenticate from the nefarious actor device 226, it will not already know that the nefarious actor device 226 is not a legitimate client device with an authentic provider client application. So, assuming the nefarious actor device 226 has provided enough information and proper information to the provider system 210 for the provider system to not yet know that the nefarious actor device 226 does not have an authentic provider client application (e.g., the nefarious actor may have obtained valid application keys as described elsewhere herein, and may even have what appears to be a valid push token), then provider system 210 may attempt to engage the push communication 137 protocol with the digital distribution system 230. Similar to what is described elsewhere with respect to 135-145, the digital distribution system 230 will attempt to communicate with the nefarious actor based on the request from the provider system 210. Even if the nefarious actor device 226 has what appears to be a valid push token, because the nefarious actor does not have an authentic copy of the provider client application that has been downloaded from the digital distribution system 230, the digital distribution system 230 will not be able to find a record of distributing the provider client application to the nefarious actor 226, and this will not have information needed to route communicate 140 to the nefarious actor device 226.

If the attempt to authentic 136 from the nefarious actor device 226 does not include a valid push token, then the digital distribution system will not be able to attempt to communicate with the nefarious actor device 226. In either case (whether the nefarious actor device 226 has what appears to be a valid push token or not), the nefarious actor device 226 will not receive from the digital distribution system 230 a valid short-term shared key. Thus, any attempt at execution by the nefarious actor device 226 will result in the provider system 210 determining that the application on the nefarious actor device 226 is not authentic, and it will not execute 166 and/or the provider system 210 will not provide the nefarious actor device 226 access to resources. Instead, the attempted spoof will fail 176. The failure may occur in a manner similar to that described with respect to failure 175. This failure will occur even if a legitimate user had logged into the nefarious application running on the device 226, including a user that has be verified with multi-factor authentication. That is, a legitimate user may have installed a spoof of the provider client application on her own device and have been authenticated with the provider using single or multifactor authentication (not shown in FIG. 1A or FIG. 1B). Notwithstanding that the legitimate user is logged in and verified using single or multifactor authentication, because the user has installed a spoof or nefarious application (perhaps even one that has a correct static application key), the provider will be able to determine that the attempted access is not from a legitimate version of the provider client application because the spoof or nefarious application will not have the short-term shared key.

In some embodiments, the nefarious actor device 226 is a device of a legitimate user and is only considered nefarious because of an illegitimate application trying to spoof the provider client application. In some embodiments, the nefarious actor device 226 is part of a system that is attempting to mimic the actions of a legitimate client device 220.

In some embodiments, the process 101 of FIG. 1B, numbered 136-176 may replace, run in parallel, or augment 135-175 in FIG. 1A.

Push notifications from the digital distribution system 230 to the client device 220 are discussed as the primary example herein. In some embodiments, other types of communications can be used. For example, a round-trip notification, broadcast notification, etc. If the digital distribution system 230 can send a communication to the client device 220 based on information or records private to the digital distribution system, and the client can securely receive the short-term shared key in that communication, then the techniques herein can use that mode of communication.

In FIG. 1, the flow of information and performance of activities are depicted and described as if each of the provider system 210, client device 220, and digital distribution system 230 are each a separate system. In some embodiments, this is the case, in others, it may be the case that one of more of the provider system 210, client device 220, and/or digital distribution system 230 comprise more than one system, device, etc. In some embodiments, entities, devices, or systems other than the provider system 210, client device 220 or 221, nefarious actor device 226, and digital distribution system 230 perform one or more of the functions of processes 100 or 101, or additional activities, communications, or functions that are not depicted in process 100 or 101.

Additional Example Embodiments Related to Push Message Failures

In embodiments described above, a determination is made whether a provider client application is authentic based on a short-term shared key sent from the provider system 210 to the digital distribution system 230, and then to the client device 220. In some embodiments, a provider system 210 may also determine that a provider client application running on a client device 220 is inauthentic based on a failed push communication from the digital distribution system 230 to the client device 220. For example, if the digital distribution system 230 fails in any way to push the notification to the client device 220, then it may send a message to the provider system 210 indicating failure of sending that message (not depicted in FIG. 1A or FIG. 1B).

In these embodiments, the client device 220 will respond to the digital distribution system 230 and the digital distribution system 230 will receive the response and determine whether the communication with the provider client application was successful, and send a response to the provider system indicating success or failure of the digital distribution system's 230 communication with the client device 220. If the digital distribution system 230 determines that it had not previously distributed the provider client application to the client device 220, then it will send a failure notice to the prover system 210 as part of determining success or failure of the communication.

If there is a record of previous download of the provider client application from the digital distribution system 230, then the digital distribution system 230 will attempt to send the communication to the client device 220. If the send is unsuccessful, then the digital distribution system 230 will send a failure response to the provider system 210. If the send was successful, then the digital distribution system 230 will send a success response to the provider system 210.

In some embodiments, the success and failure responses and/or might be HTTP/2 responses sent from the digital distribution system 230 to the provider system 210. Examples of such responses are listed in the table below, where 200 may indicate success and 400-429 may indicate failures.

| Status code | Description |
| --- | --- |
| 200 | Success |
| 400 | Bad request |
| 403 | There was an error with the certificate or with the provider authentication token |
| 410 | The device token is no longer active for the topic. |
| 413 | The notification payload was too large. |
| 429 | The server received more than a predefined threshold number of requests for the same device token. |

Returning again to FIG. 1A, the determination of authenticity 157 may include determining whether the digital distribution system 230 indicated to the provider system 210 that it was able to send the push notification to the client device 220. If the digital distribution system 230 was not able to send the push notification to the client device 220 for any reason and indicated this in its response to the provider system 210, then the provider may determine that the provider client application running on the client device 220 is not authentic 157 and may therefore terminate 175 the provider client application.

Returning to the digital distribution example, the digital distribution system may use the push token sent by the provider to attempt to communicate 140 with the client device 220 identified in the push token. If the digital distribution system has no record of the client device 220 having downloaded the HR application, then the digital distribution system may respond to the provider system 210 indicating failure (e.g., an HTTP/2 403 response or another appropriate response). If the digital distribution system has a different kind of failure, an appropriate failure response may be sent (e.g., receiving more than a predefined threshold number of requests may dictate sending an HTTP/2 429 response; if the push token is no longer active, an HTTP/2 410 response may be sent, etc.). If the communication was determined successful 150, the digital distribution system may send the provider a success response if the short-term shared key has also been received from the client device 220 (described with respect to FIGS. 1A and 1B).

Embodiments related to the use of push message failures for authentication purposes may provide a useful backstop to the techniques discussed herein.

Example Systems for Provider Client Application Authentication

FIG. 2 depicts an example system for determining provider client application authenticity in digital distribution systems. Generally, the system 200 includes a provider system 210, multiple client devices 220, 221, storage 240, 241, one or more digital distribution systems 230, and all may be coupled to a network 290. Examples of communicative coupling and networks are described elsewhere herein. In some embodiments, the processes 100 and 101 of FIGS. 1A and 1B may run on the system 200 of FIG. 2 and/or the hardware 300 of FIG. 3. For example, as implied by the labels used in FIG. 1A and FIGS. 1B, 107, 137, and 157 may be performed by provider system 210 in FIGS. 2; 115, 125, 135, 145, 165, and 175 may be performed by client device 220 or 221 in FIG. 2; 110, 120, 140 may be performed by digital distribution system 230 in FIG. 2; and 136, 146, 166, and 176 may be performed by nefarious actor device 226 of FIG. 2. In various embodiments, any of the devices or systems 210-230 of FIG. 2 may perform all the actions described herein, or a different subset than described. For example, in some embodiments, the provider and digital distribution system 230 may be a single system or a set of devices or systems acting together, and all actions described herein attributed to each may be performed together.

Provider system 210, devices 220, 221, 226, and digital distribution system 230 may run on a single computing device, multiple computing devices, in a distributed manner across a network, on one or more virtual machines, which themselves run on one or more computing devices. In some embodiments, provider system 210, devices 220, 221, 226, and digital distribution system 230 are distinct sets of processes running on distinct sets of computing devices. In other embodiments, provider system 210, devices 220, 221, 226, and digital distribution system 230 share processes or functions and/or run on the same computing devices. In some embodiments, storage 240 and 241 are communicatively coupled to provider system 210, client device 220, and digital distribution system 230 via a network 290 or other connection. Storage 240 and 241 may also be part of or integrated with provider system 210, devices 220, 221, 226, and/or digital distribution system 230 via a network 290 or other connection.

As discussed herein the various processes 10 and 101, etc. may run in parallel, in conjunction, together, or one process may be a subprocess of another. Further, any of the processes may run on the systems or hardware discussed herein.

Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
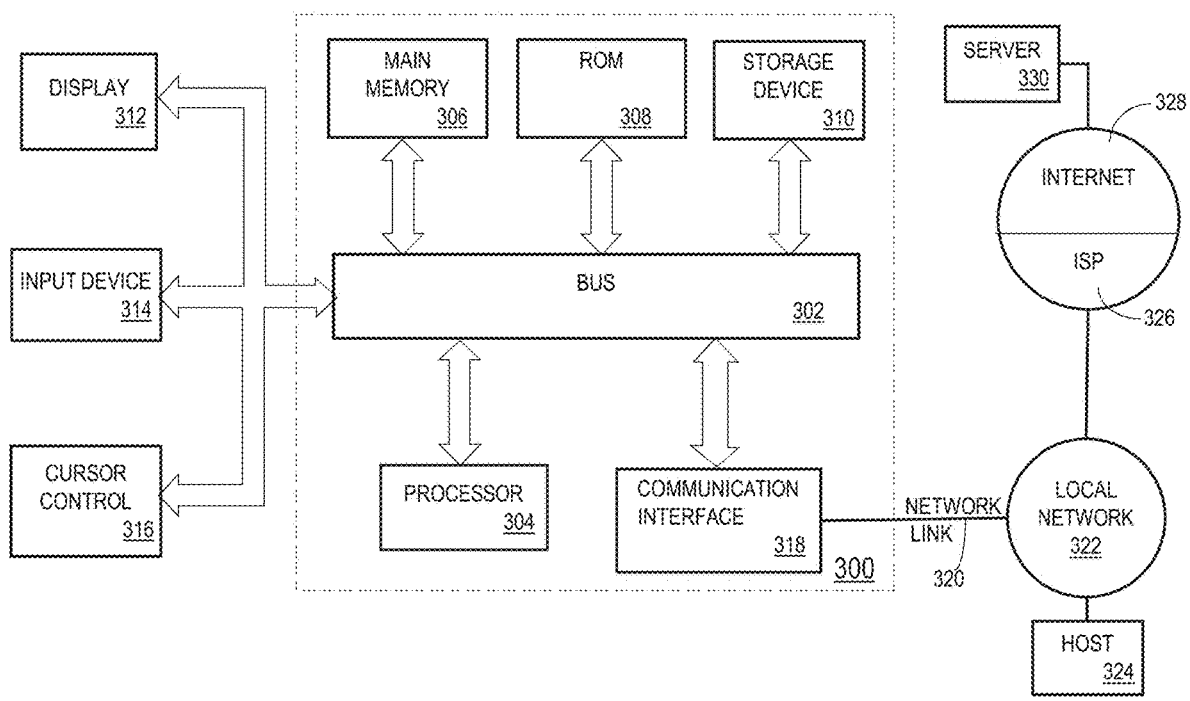
FIG. 3 depicts additional example systems and hardware for determining provider client application authenticity in digital distribution systems.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as an OLED, LED or cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane. The input device 314 may also have multiple input modalities, such as multiple 2-axes controllers, and/or input buttons or keyboard. This allows a user to input along more than two dimensions simultaneously and/or control the input of more than one type of action.

Computer system 300 may implement the techniques described herein using customized hard-wired logic, one or more ASICs or FPGAs, firmware and/or program logic which in combination with the computer system causes or programs computer system 300 to be a special-purpose machine. According to some embodiments, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information. Such a wireless link could be a Bluetooth, Bluetooth Low Energy (BLE), 802.11 WiFi connection, or the like.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A distribution server, comprising:
a plurality of memories configured to store instructions; and
a plurality of processors coupled with the plurality of memories, the plurality of processors is configured to execute the instructions, which causes one or more of the plurality of processors to perform operations comprising:
in response to a request to download an application on a client device:
transmitting the application to the client device for downloading and installing the application on the client device; and
storing first identification information for the client device at a distribution system, the first identification information comprising a record of the transmission of the application to the client device including a client device identifier and an authenticated application identifier;
receiving a request to distribute a key to the client device in response to a request for authenticating the application installed on the client device, the request received from an application server system that provides application services for the application installed on the client device and comprising second identification information received from the client device including a device identifier and an application identifier; and
in response to the received request to distribute the key, comparing the second identification information with the stored first identification information including the client device identifier and the authenticated application identifier corresponding to the previous transmission of the application; and
in response to a determination that the second identification information corresponds to the first identification information with respect to the record of the transmission of the application, transmitting the key to the client device, the key configured for use by the application installed on the client device to access the application services provided by the application server system.

2. The distribution server of claim 1, wherein for transmitting the key to the client device, the operations further comprise:
identifying the client device using one or more of: a device identifier, an application identifier, user account information, and location information.

3. The distribution server of claim 2, wherein the operations further comprise: upon not being able to identify the client device, generating a message indicating a failure in transmitting the key to the client device that requested authentication of the application.

4. The distribution server of claim 1, wherein for transmitting the key to the client device, the operations further comprise:
identifying the client device based on a push token received with or included in the request to transmit the key.

5. The distribution server of claim 4, wherein the operations further comprise: upon not being able to identify the client device, generating a message indicating a failure in transmitting the key to the client device that requested authentication of the application.

6. The distribution server of claim 1, wherein the request to transmit the key to the client device is received using a push notification protocol.

7. The distribution server of claim 1, wherein the key is valid for a particular time duration, and the key is one of: a timestamp, an encrypted timestamp, a hashed timestamp, and a unique identifier.

8. An application provider server, comprising:
a plurality of memories configured to store instructions; and
a plurality of processors coupled with the plurality of memories, the plurality of processors is configured to execute the instructions, which causes one or more of the plurality of processors to perform operations comprising:
uploading an application to a distribution system that is configured to transmit the application for downloading on a client device and store first identification information for the client device, the first identification information comprising information that uniquely identifies the client device and the transmitted application;
subsequent to the application being downloaded by the client device from the distribution system, receiving a request to authenticate the application; and
in response to the received request to authenticate the application, sending a request to the distribution system to transmit a key to the client device for authenticating the application and the client device, the request comprising second identification information received from the client device;
receiving, from the application operating on the client device, a request to access a network resource provided by the application provider server, the request comprising the key received by the client device from the distribution system, wherein the key is received in response to a determination by the distribution system that the distribution system previously transmitted the application to the client device based on using the second information to access stored first information; and determining whether to grant access to the network resource using the application from the client device based on verification of the key received from the client device.

9. The application provider server of claim 8, wherein sending the request to transmit the key to the client device comprises sending a push token that identifies the client device.

10. The application provider server of claim 8, wherein the operations further comprise:
determining a current physical location of the client device; and
reauthenticating the client device upon determining the current physical location of the client device is not within a predetermined boundary of a prior physical location associated with the client device.

11. The application provider server of claim 8, wherein the operations further comprise:
in response to successful verification of the key received from the client device, granting access to the network resource to the client device using the application installed on the client device.

12. The application provider server of claim 8, wherein the operations further comprise:
authenticating a user of the client device using a single-factor authentication scheme or a two-factor authentication scheme.

13. The application provider server of claim 8, wherein the operations further comprise:
in response to failed verification of the key received from the client device, preventing access to the network resource to the client device using the application installed on the client device.

14. The application provider server of claim 8, wherein the key is valid for a particular time duration, and the key is one of: a timestamp, an encrypted timestamp, a hashed timestamp, and a unique identifier.

15. A method, comprising:
transmitting, from an application provider server to a distribution server, an application for installation on a client device, wherein the distribution server is configured to store first identification information for the client device, the first identification information comprising information that uniquely identifies the client device and the application;
subsequent to an installation of the application on the client device, receiving, at the application provider server, a request to authenticate the application;
in response to the received request to authenticate the application, sending, from the application provider server to the distribution server, a request to distribute a key to the client device, the request comprising second identification information received from the client device;
receiving, at the application provider server from the client device, a request to access a network resource provided by the application provider server, the request comprising the key transmitted to the client device from the distribution server, the key transmitted to the client device in response a request from the application provider server to the distribution server to cause the key to be sent to the client device from the distribution server, wherein the key is transmitted in response to a determination by the application provider server that the application provider server previously transmitted the application to the client device based on using the second information to access stored first information; and
determining, by the application provider server, whether to grant access to the network resource using the application from the client device based on verification of the key received from the client device.

16. The method of claim 15, further comprising:
in response to successful verification of the key received from the client device, granting, by the application provider server, access to the network resource to the client device using the application installed on the client device.

17. The method of claim 15, further comprising:
in response to a request for accessing the network resource from the client device, determining, by the application provider server, a current physical location of the client device; and
reauthenticating, by the application provider server, the client device upon determining the current physical location of the client device is not within a predetermined boundary of a prior physical location associated with the client device.

18. The method of claim 15, further comprising:
in response to a request for accessing the network resource from the client device, authenticating, by the application provider server, a user of the client device using a single-factor authentication scheme or a two-factor authentication scheme.

19. The method of claim 15, wherein the key distributed to the client device is valid for a predetermined time period.

20. The method of claim 15, further comprising:
in response to failed verification of the key received from the client device, preventing, by the application provider server, access to the network resource to the client device using the application installed on the client device.

* * * * *